(12) United States Patent
Larosa et al.

(10) Patent No.: US 9,729,058 B2
(45) Date of Patent: Aug. 8, 2017

(54) CONVERTER CIRCUIT WITH INJECTION OF RIPPLE CURRENT FOR COMPARISON

(71) Applicant: STMicroelectronics S.r.l., Agrate Brianza (IT)

(72) Inventors: Manuela Larosa, Gravina di Catania (IT); Giovanni Sicurella, Catania (IT); Giuseppe Platania, Valverde (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/157,554

(22) Filed: May 18, 2016

(65) Prior Publication Data

US 2017/0085178 A1  Mar. 23, 2017

(30) Foreign Application Priority Data

Sep. 22, 2015 (IT) .................... 102015000053873

(51) Int. Cl.
*H02M 3/158* (2006.01)
*H02M 3/156* (2006.01)
*H02M 1/00* (2006.01)

(52) U.S. Cl.
CPC ........... *H02M 3/158* (2013.01); *H02M 3/156* (2013.01); *H02M 2001/0025* (2013.01)

(58) Field of Classification Search
CPC ...... H02M 1/14; H02M 3/155–3/1588; H02M 2001/0025
See application file for complete search history.

(56) References Cited

U.S. PATENT DOCUMENTS

| 5,982,160 A | * | 11/1999 | Walters | H02M 3/156 323/222 |
| 8,593,125 B1 | * | 11/2013 | Xue | H02M 3/156 323/280 |
| 2004/0004470 A1 | * | 1/2004 | Yoshida | H02M 3/1563 323/284 |

(Continued)

OTHER PUBLICATIONS

IT Search Report and Written Opinion for IT 102015000053873 dated Jun. 1, 2016 (7 pages).

(Continued)

*Primary Examiner* — Matthew Nguyen
*Assistant Examiner* — Yusef Ahmed
(74) *Attorney, Agent, or Firm* — Gardere Wynne Sewell LLP

(57) ABSTRACT

A boost-type converter circuit includes a pair of converter switches that are alternatively switchable on and off. An inductor is coupled to the intermediate point between the converter switches. A driver module controls switching on and off of the converter switches in respond to a comparator output signal. A reference signal line provides to the comparator a reference signal, and an output feedback line provides to the comparator an output feedback signal. These signals are compared to each other to generate the comparator output signal for controlling the driver module. A low-pass filter network is coupled to the inductor and configured to provide a ripple current which is a low-pass filtered replica of the current through the inductor. An injector circuit injects the ripple current into the reference signal line coupled to the comparator.

12 Claims, 2 Drawing Sheets

(56) References Cited

U.S. PATENT DOCUMENTS

| | | | | |
|---|---|---|---|---|
| 2007/0013353 | A1* | 1/2007 | Noma | H02M 3/1588 323/284 |
| 2007/0035281 | A1* | 2/2007 | Kuroiwa | H02M 3/156 323/222 |
| 2008/0061750 | A1* | 3/2008 | Stoichita | H02M 3/1563 323/271 |
| 2008/0088292 | A1* | 4/2008 | Stoichita | H02M 3/156 323/285 |
| 2011/0127980 | A1* | 6/2011 | Chen | H02M 3/156 323/282 |
| 2012/0217941 | A1* | 8/2012 | Chen | H02M 3/156 323/271 |
| 2012/0274296 | A1* | 11/2012 | Higuchi | H02M 3/156 323/282 |
| 2012/0274301 | A1* | 11/2012 | Nakashima | H02M 3/1588 323/284 |
| 2013/0300390 | A1* | 11/2013 | Lee | H02M 3/1563 323/282 |
| 2014/0027188 | A1 | 1/2014 | Holland | |
| 2014/0132232 | A1* | 5/2014 | MacLean | G05F 1/62 323/271 |
| 2014/0176107 | A1* | 6/2014 | Yu | H02M 1/08 323/285 |
| 2014/0347027 | A1* | 11/2014 | Jayaraj | H02M 3/1563 323/282 |
| 2014/0375285 | A1* | 12/2014 | Chen | H02M 3/158 323/271 |
| 2015/0180338 | A1* | 6/2015 | Choi | H02M 3/156 323/271 |
| 2015/0263617 | A1* | 9/2015 | Xue | H02M 3/156 323/271 |
| 2015/0280557 | A1* | 10/2015 | Xue | H02M 3/157 323/271 |
| 2015/0338866 | A1* | 11/2015 | Hu | H02M 3/157 323/280 |
| 2015/0364995 | A1* | 12/2015 | Chen | H02M 3/158 323/271 |
| 2016/0099640 | A1* | 4/2016 | Cho | H02M 3/1582 323/271 |
| 2016/0204702 | A1* | 7/2016 | Padyana | H02M 1/15 323/271 |
| 2016/0204704 | A1* | 7/2016 | Cao | H02M 3/156 323/271 |
| 2016/0336858 | A1* | 11/2016 | Nomiyama | H02M 3/158 |

OTHER PUBLICATIONS

Zhang, Nancy et al: "D-CAP(tm) Mode With All-Ceramic Output Capacitor Application," Texas Instruments Application Report SLVA453, Feb. 2011 (9 pages).

Texas Instruments: "Understanding Boost Power Stages in Switchmode Power Supplies," Application Report, Mixed Signal Products, SLVA061, Mar. 1999 (32 pages).

Zhang, Nancy, et al: "D-CAP(tm) Mode With All-Ceramic Output Capacitor Application," Texas Instruments, Application Report, SLVA452, Feb. 2011 (9 pages).

* cited by examiner

CONVERTER CIRCUIT WITH INJECTION OF RIPPLE CURRENT FOR COMPARISON

PRIORITY CLAIM

This application claims priority from Italian Application for Patent No. 102015000053873 filed Sep. 22, 2015, the disclosure of which is incorporated by reference.

TECHNICAL FIELD

The description relates to converter circuits. One or more embodiments may apply to boost converter circuits.

BACKGROUND

Converter circuits are used in a wide gamut of applications, e.g. in power supply units for powering electronic devices.

A boost topology (also known as step-up power stage, since the output voltage is higher than the input voltage) is oftentimes selected for such converters due to various factors, including e.g. the output voltage having the same polarity of the input and being non-isolated from the input.

A continuous demand therefore exists for improved arrangements which may be applied to converter topologies such as e.g. boost converter topologies.

SUMMARY

One or more embodiments may relate to an apparatus (e.g. a regulated power supply) and a control method.

One or more embodiments may provide a control architecture for regulating e.g. a boost converter by using a ripple injection approach.

In one or more embodiments a ripple signal may be added to a reference signal ensuring system stability in various operating configurations by allowing, e.g. an automatic transition from continuous to discontinuous mode.

One or more embodiments may show high efficiency even with low loads and are thus suitable for use in low power consumption applications.

One or more embodiments may permit to provide very low power consumption boost converters with seamless transition from discontinuous to continuous mode regulation.

In an embodiment, a converter circuit comprises: a pair of converter switches alternatively switchable on and off, said pair of converter switches having an intermediate point therebetween, an inductor coupled to the intermediate point between the converter switches of said pair of converter switches, a driver module configured to switch on and off said pair of converter switches in response to an output signal from a comparator, a reference signal line configured to provide to said comparator a reference signal, an output feedback line configured to provide to said comparator an output feedback signal for comparison with said reference signal, wherein said comparator is configured to control said driver module with said output signal as a function of the comparison of said output feedback signal with said reference signal, a low-pass filter network coupled to said inductor and configured to provide a ripple current which is a low-pass filtered replica of a current through said inductor, and an injector circuit configured to inject said ripple current into said reference signal line.

In an embodiment, a converter circuit comprises: an input configured to receive an input voltage; an inductor coupled between said input and a switching node; a first transistor switch coupled between the switching node and a reference supply node; a second transistor switch coupled between the switching node and an output node supplying an output voltage; a driver circuit configured to switch on and off the first and second transistors in response to a control signal; a comparator circuit configured to generate said control signal and having a first input and a second input; a first voltage divider circuit coupled between the output node and the reference supply node, the first voltage divider circuit having a first intermediate node coupled to the first input of the comparator; a second voltage divider circuit coupled between a reference voltage node and the reference supply node, the second voltage divider circuit having a second intermediate node coupled to the second input of the comparator; a low pass filter coupled to said inductor and configured to generate a ripple signal; and a feedback circuit coupling said ripple signal to said second intermediate node of the second voltage divider circuit.

In an embodiment, a method is provided for controlling operation of converter circuits including a pair of converter switches alternatively switchable on and off, said pair of converter switches having an intermediate point therebetween with an inductor coupled to the intermediate point between the converter switches of said pair of converter switches. The method includes: switching on and off said pair of converter switches as a function of the comparison of an output feedback signal and a reference signal, generating a ripple current which is a low-pass filtered replica of a current through said inductor, and injecting said ripple current into said reference signal.

BRIEF DESCRIPTION OF THE DRAWINGS

One or more embodiments will now be described, by way of example only, with reference to the enclosed figures, in which.

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

Figure 1:
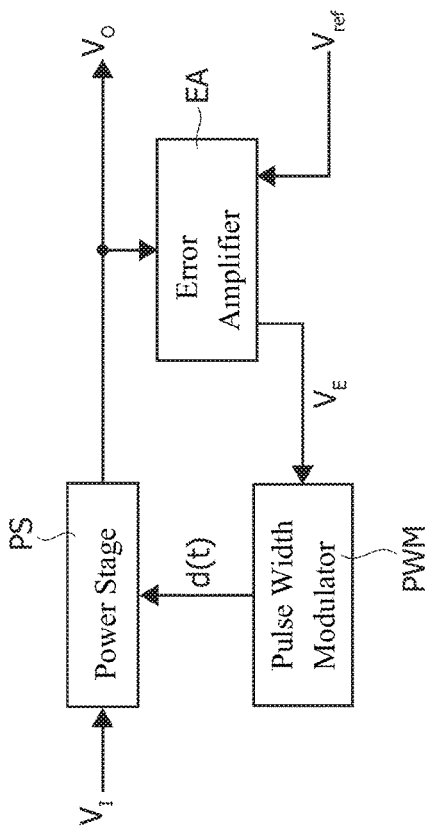
FIG. 1 is a general block diagram exemplary of regulated output control in a boost converter circuit.

FIG. 1 is a diagram exemplary of an approach that may be adopted in converters such as a boost converter in order to control the regulated output Vo by resorting to a feedback scheme.

In the exemplary diagram of FIG. 1, the output voltage $V_O$ is compared with a reference voltage $V_{ref}$ in an error amplifier EA, and the error voltage $V_E$ is sent to a pulse width modulator PWM. The modulator provides a signal d(t) which dictates the duty cycle applied in a power stage PS which is fed with an input voltage $V_I$ and provides the output voltage $V_O$.

The structure and operation of such an arrangement are known in the art, which makes it unnecessary to provide a more detailed description herein.

A similar approach is described e.g. in U.S. Patent Application Publication No. 2014/0027188 A1 (incorporated by reference), where output and input voltages are scaled and compared in order to obtain a feedback voltage.

Other control approaches may be adopted e.g. in so-called buck converters in order to reduce the power consumption at low loads. For instance, a ripple generated by a RC filter may represent a virtual current information to be summed with an output feedback signal. This value may be continuously compared with a reference voltage and fed as an input to a control logic and a driver in the buck converter. In such an arrangement, a constant peak current may flow in the inductor.

Figure 2:
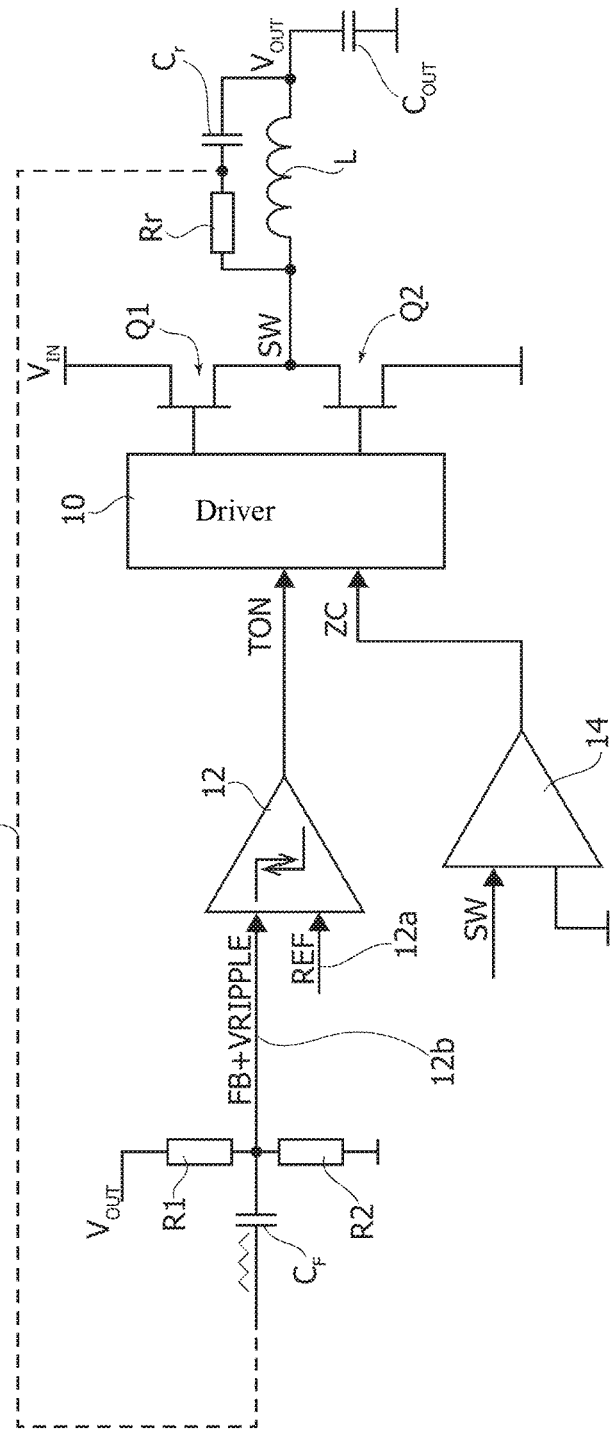
FIG. 2 is a schematic circuit diagram of a converter circuit.

Such a converter circuit architecture as exemplified in FIG. 2 may include a pair of converter switches Q1, Q2 (e.g. solid-state switches such as transistors e.g. MOSFETs) set between an input voltage VIN and ground. In operation, the converter switches Q1, Q2 may be alternatively switched on and off so that a switching signal SW may be present at an intermediate point between the switches Q1, Q2.

An inductor L may be coupled to the intermediate point between the converter switches Q1, Q2 to provide an output signal VOUT towards an output capacitor $C_{OUT}$.

Also, a driver module (logic control and driver) 10 may be provided for switching on and off the converter switches Q1, Q2 under the control of a comparator (error amplifier) 12.

A reference signal may be provided to the comparator 12 over an input line 12a for a reference signal.

An output feedback signal may be provided to the comparator 12 over an input line 12b for an output feedback signal.

The comparator 12 may thus control (see e.g. the signal TON) the driver module 10 (and thus on and off switching of the converter switches Q1, Q2) as a function of the comparison (e.g. the error) between the output feedback signal and the reference signal supplied to the comparator.

A low-pass filter network (e.g. a RC network including a resistor Rr and a capacitor Cr) may be coupled (e.g. in parallel) to the inductor L to provide a ripple current Ir that is a low-pass filtered replica of the current through the inductor L.

In the arrangement shown in FIG. 2, the ripple current Ir is injected (e.g. via an injector circuit including a capacitor CF and a voltage divider including two resistors R1, R2 set between the output voltage VOUT and ground) into the output feedback line 12b to the comparator 12.

In the arrangement shown in FIG. 2, the comparator 12 may control the driver module 10 (and thus the converter switches Q1, Q2) as a function of the comparison between a reference signal REF supplied to the comparator 12 over the reference signal line 12a and an output feedback signal FB+VRIPPLE (including a contribution from the ripple current Ir) supplied to the comparator 12 on the output feedback line 12b.

In an arrangement as shown in FIG. 2, the driver module 10 may also be sensitive to a signal ZC provided by a zero crossing comparator 14.

In the comparator 14 the zero crossings of the switching signal SW between the converter switches Q1, Q2 may be detected with respect to ground, in order to avoid negative currents during the TOFF time (that is when discharging the inductor current, previously charged during TON). For instance, as soon as the inductor current becomes zero, the high side switch Q1 is turned off.

The arrangement shown in FIG. 2 may exhibit low power consumption at low loads, where substantially only the comparators 12 and 14 are always on, while the other parts of the converter may be off.

The TON and TOFF signals that drive the logic control (driver 10) of the inductor currents may be strictly related to the values Rr and Cr values in the RC filter network coupled to the inductor L, with the peak-to-peak value of the inductor current largely independent of the regulated output voltage VOUT and the input voltage VIN.

Figure 3:
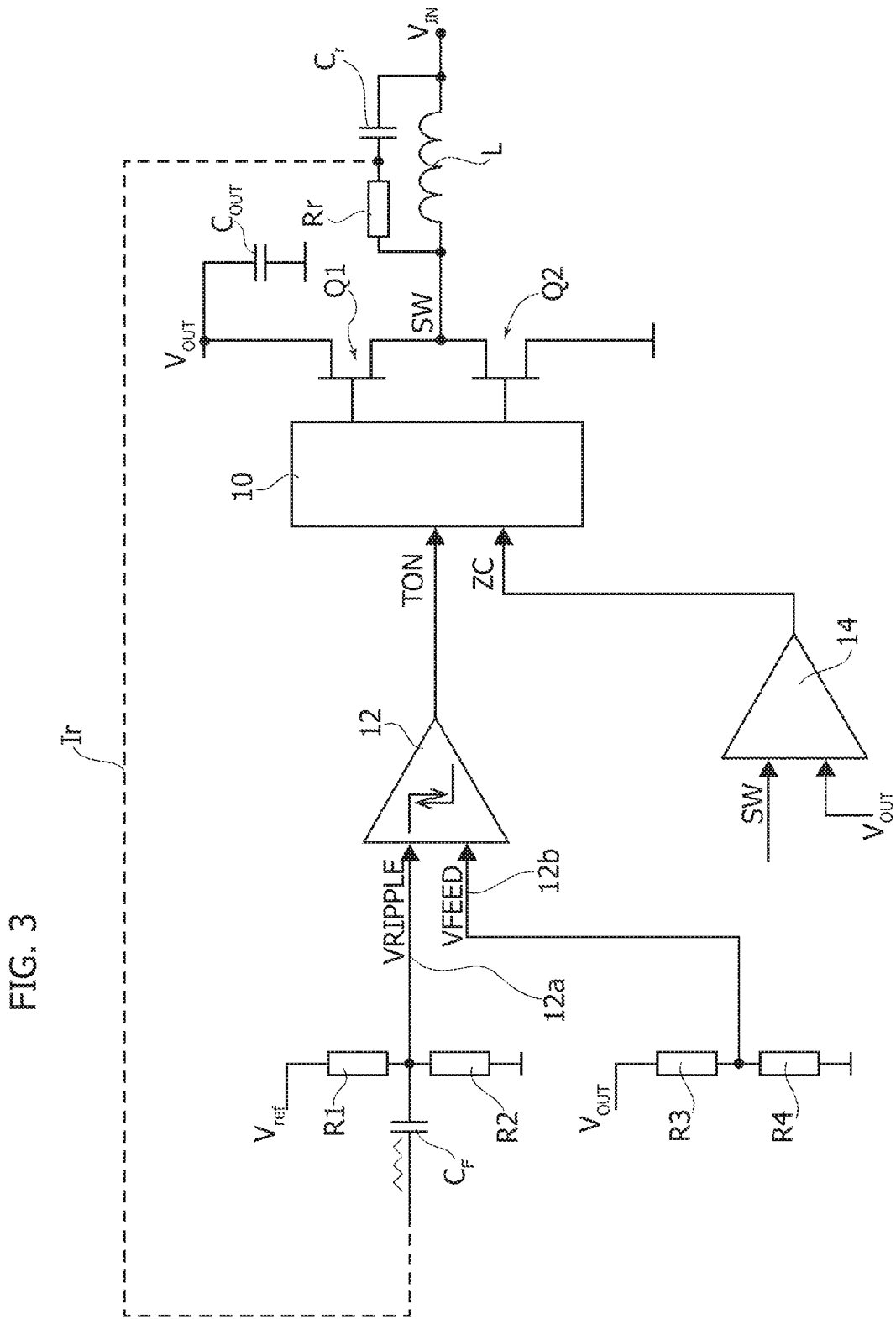
FIG. 3 is a schematic circuit diagram of a converter circuit according to one or more embodiments.

One or more embodiments of a boost converter as exemplified in FIG. 3 may retain a certain number of components already appearing in the layout introduced in connection with FIG. 2. These components are thus indicated with the same reference symbols in FIG. 3; for the sake of brevity a corresponding description will not be repeated here other than for the differences discussed in the following.

In one or more embodiments as exemplified in FIG. 3, the ripple current Ir obtained by low-pass (e.g. RC) filtering the current through the inductor L (to which, in the layout of FIG. 3 the input voltage VIN is applied) may be injected into the reference signal line 12a of the comparator 12 as a signal VRIPPLE to be compared with an output feedback signal VFEED applied to the output feedback signal line 12b to the comparator 12.

Injection of the ripple current Ir into the reference signal line 12a of the comparator 12 may be again via an injector circuit including a capacitor CF and a voltage divider including two resistors R1, R2 set between a reference voltage Vref (from a reference generator not visible in the figure) and ground.

Also, the output feedback signal VFEED applied to the output feedback signal line 12b of the comparator 12 may be obtained via a voltage divider including two resistors R3, R4 set between an output voltage VOUT and ground.

In one or more embodiments as exemplified in FIG. 3, the output voltage VOUT may be applied across an output capacitor $C_{OUT}$ with the converter switches Q1, Q2 set (and thus acting) between the output voltage VOUT across the output capacitor $C_{out}$ and ground, thus providing a small equivalent series resistance (ESR) and small VOUT ripple.

In one or more embodiments as exemplified in FIG. 3, a zero crossing comparator 14 may again be provided in order to provide the signal ZC to the driver 10 by detecting "zero crossing" events (this wording is adopted even though the level against which crossings are detected may no longer be zero) of the switching signal SW between the converter switches Q1, Q2 with respect to the output signal VOUT in order to avoid negative currents during the TOFF time.

In one or more embodiments as exemplified in FIG. 3, the reference value followed by the control system to provide regulation may thus change continuously.

As in the case of the buck converter of FIG. 2, only two blocks for comparison (e.g. the comparators 12 and 14) and a reference generator (to provide Vref) may be ON in low load conditions, leading to low power consumption level.

One or more embodiments as exemplified in FIG. 3, may be implemented using e.g. BCD (Bipolar-CMOS-DMOS) technologies.

Experiments performed (e.g. with $V_{IN}$=2V, $V_{OUT}$=4V and $I_{LOAD}$=100 mA) have shown a seamless transitions from discontinuous to continuous mode when switching respectively low and higher loads, e.g. by changing the output current from 150 mA to 0 mA and then to 20 mA. Fast load changes (e.g. 1 µsec) show that the current flowing in the inductor may follow continuously the variation, e.g. from 150 mA to 0 mA and vice-versa.

Variation of the input voltage has also been tested, e.g. with $V_{IN}$ moved from 2.4 V to 2.8 V and back again with a limited variation of the $V_{OUT}$. The regulated output voltage has also been changed and the regulation has been tested in this condition with $V_{OUT}$ is changed from 4 V to 4.2 V with thoroughly satisfactory results.

Without prejudice to the underlying principles, the details and embodiments may vary, even significantly, with respect to what has been described by way of example only without departing from the extent of protection.

The invention claimed is:

1. A converter circuit, comprising:
a pair of converter switches alternatively switchable on and off, said pair of converter switches having an intermediate point therebetween,
an inductor coupled to the intermediate point between the converter switches of said pair of converter switches,
a driver module configured to switch on and off said pair of converter switches in response to an output signal from a comparator,
a reference signal line configured to provide to said comparator a reference signal,
an output feedback line configured to provide to said comparator an output feedback signal for comparison with said reference signal,
wherein said comparator is configured to control said driver module with said output signal as a function of the comparison of said output feedback signal with said reference signal,
a low-pass filter network coupled to said inductor and configured to provide a ripple current which is a low-pass filtered replica of a current through said inductor, and
an injector circuit configured to inject said ripple current into said reference signal line, said injector circuit comprising:
a reference voltage divider between a reference input voltage line and ground, said reference signal line being coupled to an intermediate point of said reference voltage divider, and
a ripple current line coupling said low-pass filter network to said intermediate point of said reference voltage divider.

2. The converter circuit of claim 1, including a capacitor interposed in said ripple current line coupled to said intermediate point of said reference voltage divider.

3. The converter circuit of claim 1, wherein said low-pass filter network is coupled in parallel to said inductor, and comprises an RC low-pass network.

4. The converter circuit of claim 1, including an output feedback voltage divider between a converter output line and ground, said output feedback line being coupled to an intermediate point of said output feedback voltage divider.

5. The converter circuit of claim 1, including a zero crossing comparator configured to control said driver module for switching on and off said pair of converter switches, said zero crossing comparator having a first input coupled to the intermediate point between the converter switches of said pair of converter switches and a second input coupled to a converter output line, wherein said zero crossing comparator controls said driver module as a function of the comparison of a switch signal at said intermediate point between the converter switches of said pair of converter switches and the output voltage from the converter circuit.

6. The converter circuit of claim 1, wherein the converter circuit is a boost converter with said inductor being coupled to an input voltage line and said pair of converter switches set between a converter output voltage line and ground.

7. The converter circuit of claim 1, wherein said pair of converter switches comprises electronic MOSFET switches.

8. A converter circuit, comprising:
an input configured to receive an input voltage;
an inductor coupled between said input and a switching node;
a first transistor switch coupled between the switching node and a reference supply node;
a second transistor switch coupled between the switching node and an output node supplying an output voltage;
a driver circuit configured to switch on and off the first and second transistors in response to a control signal;
a comparator circuit configured to generate said control signal and having a first input and a second input;
a first voltage divider circuit coupled between the output node and the reference supply node, the first voltage divider circuit having a first intermediate node coupled to the first input of the comparator;
a second voltage divider circuit coupled between a reference voltage node and the reference supply node, the second voltage divider circuit having a second intermediate node coupled to the second input of the comparator;
a low pass filter coupled to said inductor and configured to generate a ripple signal; and
a feedback circuit coupling said ripple signal to said second intermediate node of the second voltage divider circuit.

9. The converter circuit of claim 8, wherein said feedback circuit includes a capacitor coupled in series between the low pass filter and the second intermediate node of the second voltage divider circuit.

10. The converter circuit of claim 8, further comprising a zero-crossing detector circuit configured to generate a zero-cross control signal for application to said driver circuit.

11. The converter circuit of claim 10, wherein said zero-crossing detector circuit has a first input coupled to said switching node and a second input coupled to said output node.

12. The converter circuit of claim 8, where said low pass filter comprises:
a resistor and capacitor coupled in series between a first terminal of the inductor and a second terminal of the inductor, said ripple signal generated at an intermediated node between the resistor and capacitor.

* * * * *

UNITED STATES PATENT AND TRADEMARK OFFICE
CERTIFICATE OF CORRECTION

| | | |
|---|---|---|
| PATENT NO. | : 9,729,058 B2 | Page 1 of 1 |
| APPLICATION NO. | : 15/157554 | |
| DATED | : August 8, 2017 | |
| INVENTOR(S) | : Manuela La Rosa et al. | |

It is certified that error appears in the above-identified patent and that said Letters Patent is hereby corrected as shown below:

In the Specification

At Column 4, Line number 55, please replace the term [[$C_{our}$]] with the term -- $C_{out}$ --.

Signed and Sealed this
Twelfth Day of September, 2017

Joseph Matal
*Performing the Functions and Duties of the
Under Secretary of Commerce for Intellectual Property and
Director of the United States Patent and Trademark Office*